United States Patent [19]

Shuford

[11] Patent Number: 5,453,324
[45] Date of Patent: Sep. 26, 1995

[54] CARBON-CARBON SUBSTRATES HAVING PROTECTIVE COATING AND THEIR PREPARATION

[75] Inventor: David M. Shuford, Arlington, Tex.

[73] Assignee: Loral Vought Systems Corporation, Grand Prairie, Tex.

[21] Appl. No.: 638,045

[22] Filed: Aug. 6, 1984

Related U.S. Application Data

[63] Continuation-in-part of Ser. No. 453,930, Dec. 28, 1982, Pat. No. 4,465,777, which is a continuation of Ser. No. 252,117, Apr. 8, 1981, abandoned.

[51] Int. Cl.[6] .............................. B32B 9/00; B05D 3/02
[52] U.S. Cl. .................. 428/408; 427/374.3; 427/376.2; 427/376.3; 427/379; 427/380; 427/419.7; 428/325; 428/698; 428/701; 428/702; 428/704
[58] Field of Search .................. 427/419.7, 379, 427/380, 374.3, 376.2, 376.3, 113; 428/408, 325, 698, 701, 702, 704; 501/88, 154

[56] References Cited

U.S. PATENT DOCUMENTS

| | | | |
|---|---|---|---|
| Re. 26,885 | 5/1970 | Harris | 117/215 |
| 2,843,507 | 7/1958 | Long | 117/129 |
| 3,140,193 | 7/1964 | Kane | 117/8 |
| 3,275,471 | 9/1966 | Lowell et al. | 427/6 |
| 3,348,929 | 10/1967 | Valtschev et al. | 427/113 X |
| 3,385,723 | 5/1968 | Pickar | 117/46 |
| 3,396,054 | 8/1968 | Gremion | 117/227 |
| 3,476,586 | 11/1969 | Valtchev et al. | 117/71 |
| 3,485,296 | 12/1969 | Lazaridis et al. | 165/105 |
| 3,554,717 | 1/1971 | Shaffer et al. | 51/307 |
| 3,562,007 | 2/1971 | Bockstie, Jr. | 117/218 |
| 3,666,507 | 5/1972 | Alper et al. | 106/44 |
| 3,672,936 | 7/1972 | Ehrenreich | 117/46 |
| 3,753,744 | 8/1973 | Komaru et al. | 106/56 |
| 3,765,912 | 10/1973 | Gates, Jr. et al. | 106/44 |
| 3,853,566 | 12/1974 | Prochazka | 106/44 |
| 3,947,550 | 3/1976 | Fitchmun | 423/345 |
| 3,960,577 | 6/1976 | Prochazka | 106/44 |
| 3,977,294 | 8/1976 | Jahn | 89/36 |
| 4,045,593 | 8/1977 | Hill et al. | 427/59 |
| 4,080,415 | 3/1978 | Coppola et al. | 264/65 |
| 4,119,189 | 10/1978 | Ehrenreich | 192/107 |
| 4,133,689 | 1/1979 | Stroke | 106/44 |
| 4,141,948 | 2/1979 | Laskow et al. | 264/101 |
| 4,224,073 | 9/1980 | Sasaki et al. | 106/44 |
| 4,465,777 | 8/1984 | Shuford | 427/419.7 X |
| 4,471,023 | 9/1984 | Shuford | 427/419.7 X |

FOREIGN PATENT DOCUMENTS 1026055 4/1966 United Kingdom.

OTHER PUBLICATIONS

Curry, et al. Material Characteristics of Space Shuttle Reinforced Carbon-Carbon (Apr. 1973) (pp. 1524–1538).
Rogers, et al. "Formation Mechanism of a Silicon Carbide Coating for a Reinforced Carbon-Carbon Composite" Soc. for the Advancement of Material and Process Engineering, 1975 (pp. 319–336).
Rogers, et al., "Material Development Aspects of an Oxidation Protection System for a Reinforced Carbon-Carbon composite" Soc. for the Advancement of Materials & Process Engineering, 1976 (pp. 308–30).

*Primary Examiner*—Richard D. Lovering
*Attorney, Agent, or Firm*—Richards, Medlock & Andrews

[57] ABSTRACT

In accordance with the invention, compositions of matter are provided for forming two coatings for protecting carbonaceous substrates from degradation at elevated temperatures and to improve said substrate's resistance to surface crazing and cracking. Preferably, the compositions are a mixture of particulate silicon, silicon carbide, alumina and boron. Preferably, the primary mixture contains between about 40% and 50% silicon by weight of the total composition, between about 30% and 50% silicon carbide by weight of the total composition, and between about 20% and 30% alumina by weight of the total composition. Preferably, the secondary mixture contains between about 25% and 40% silicon by weight of the total composition, between about 50% and 70% silicon carbide by weight of the total composition, between about 1% and 15% boron by weight of the total composition, and a minor amount of magnesium oxide. The method is provided for forming a primary protective coating on carbonaceous substrates utilizing the aforesaid primary and secondary mixtures.

20 Claims, No Drawings

CARBON-CARBON SUBSTRATES HAVING PROTECTIVE COATING AND THEIR PREPARATION

This application is a continuation-in-part of application Ser. No. 453,930 filed Dec. 28, 1982, issued Aug. 14, 1984 as U.S. Pat. No. 4,465,777, which in turn was a continuation of application Ser. No. 252,117 filed Apr. 8, 1981, now abandoned.

TECHNICAL FIELD

This invention relates to the protection of carbon and graphite materials from degradation at elevated temperatures and to improved protective coatings which resist surface cracking and crazing. More particularly, the invention relates to the protection of reinforced carbon-carbon composite substrate materials, utilizing compositions of matter containing alumina, boron, silicon carbide, and silicon for forming protective coatings that protect the substrate from degradation at elevated temperatures in oxygen containing environments and resist surface cracking and crazing.

BACKGROUND ART

Graphite and carbon materials, especially reinforced carbon-carbon composite substrate materials, are subject to many applications in modern industry, particularly in the aerospace and aviation fields. However, such materials, when unprotected, are subject to degradation at elevated temperatures. Since many applications involve high temperatures, resistance to high temperature and thermal shock are often required properties of the material.

Reinforced carbon-carbon composite substrates are generally constructed of fibers and bound by a carbon matrix, resulting in a material having excellent structural properties. Generally, carbonaceous fibers such as polyacrylonitrile, rayon or pitch-based fibers are utilized. Carbon-carbon impregnation materials generally are phenolic, furfuryl or pitch-based materials. However, the use of a specific substrate material is not a limitation upon the present invention.

Graphite and carbon materials, including reinforced carbon-carbon composites, are subject to degradation, such as oxidation, when utilized in high temperature environments in the presence of oxygen. Generally, an unprotected graphite or carbon material will begin to oxidize at temperatures in excess of about 650° F. in air. Therefore, in order to effectively utilize these materials in high temperature applications, it is necessary to provide protection from degradation, including oxidation. Accordingly, a need exists for a composition of matter and method for forming protective coatings on graphite and carbon materials, and especially for reinforced carbon-carbon composite materials.

One indication of high temperature degradation resistance is the percent weight change of the coated substrate or part that is exhibited over a period of exposure in an elevated temperature environment containing oxygen. It is desirable for a coated substrate not to exhibit a significant weight change after exposure to high temperatures in oxygen containing environments since this could affect the performance of the device incorporating such materials.

Accordingly, a need exists for a method and composition of matter for forming protective coatings on carbon substrates that provide resistance to degradation at elevated temperatures of up to about 3000° F. and to improve said substrates resistance to thermal shock. Further, a need exists for a method and composition of matter for forming protective coatings on reinforced carbon-carbon composite substrates wherein protection from degradation is provided at elevated temperatures where temperature cycling frequently occurs, thereby subjecting the substrate to varying temperatures between about 3000° F. and below 0° F. Finally, improved coatings which are resistant to cracking and crazing, which adversely affect their ability to protect the substrate, are needed.

DISCLOSURE OF THE INVENTION

In accordance with the present invention, a composition and method is provided for forming a novel coating on carbonaceous substrate materials by separate application of two coating compositions (for convenience only, referred to herein as primary and secondary) which cure to form a single improved coating with excellent resistance to cracking and crazing. The resultant novel coated substrates formed in accordance with the method and composition of the present invention exhibit excellent resistance to oxidation and degradation at temperatures between about 1600° F. and 3000° F. in oxygen containing environments. Such resistance is also greatly improved at temperatures as low as 1000° F.

Broadly stated, the primary composition for forming the primary protective coating on carbonaceous substrate materials comprises between about 40% and 50% particulate silicon by weight of the total composition, between about 30% and 50% particulate silicon carbide by weight of the total composition and, between about 20% and 30% particulate alumina by weight of the total composition. The preferred composition contains about 30% by weight silicon carbide about 50% by weight silicon and about 20% by weight alumina.

In another aspect, the primary composition of particulate silicon, silicon carbide, and particulate alumina can be admixed with a carrier liquid such as water, isopropyl alcohol, and mixtures thereof. Sufficient carrier liquid should be employed to form a slurry that can be poured or pumped into a retort. In general from about 75 parts by weight of the powder mixture to about 25 parts by weight of carrier liquid is used to form the slurry.

In accordance with the method of the present invention, the primary composition is formed into a coating on carbonaceous substrates by contacting the substrate with the dry mixture or the slurried mixture and, thereafter, heating the substrate to between about 2750° F. and 3000° F. in an inert atmosphere for a period of time sufficient to form a coating of the desired thickness on the substrate. Generally, the substrate and mixture will be heated for a period of between about 3 to about 5 hours to form a coating that is usually between about 5 and 50 mils thick. The thickness of the coating formed from the primary composition obtained depends on several factors, including the time-temperature profile (TTP), the concentration of the components, and the type of substrate material.

Broadly stated, the secondary composition for forming the protective coating on carbonaceous substrate materials comprises between about 25% and 40% particulate silicon by weight of the total composition, between about 50% and 70% particulate silicon carbide by weight of the total composition and between about 1% and 15% of particulate boron by weight of the total composition. The composition should also include a minor amount of magnesium oxide. Magnesium oxide is generally present in sufficient quantity as an impurity in technical grade particulate boron. Alternative to a dry mix, a slurry, such as that described above in relation to the primary composition mix, can be prepared.

In accordance with the method of the present invention, the secondary composition is applied over the coating formed on carbonaceous substrate materials by the primary composition. Preferably, the material that is to be coated is encased in a release agent that is a carbonaceous material, such as filter paper, free of metallic impurities. The encased substrate is contacted with the aforesaid mixture. Thereafter, the encased substrate and mixture is heated and maintained between about 2750° F. and about 3250° F. in an inert atmosphere for a period of time sufficient to form a coating of the desired thickness on the surface of the substrate from the mixture. The encased substrate is maintained in contact with the mixture during heating. Generally, the encased substrate and mixture will be heated for a period of between about 3 and 5 hours to form the secondary layer of the coating that is usually between about 5 and 30 mils thick. The thickness of the secondary layer of the coating obtained depends on several factors, including the time-temperature profile (TTP), the concentration of components and the type of substrate material.

The coating formed from the primary and secondary compositions is useful for protecting the substrate material from degradation at temperatures between about 2500° F. and 3000° F. in air and for resisting the effects of thermal shock. While the reasons for the effectiveness of these coatings is not fully understood, it is postulated that the silicon carbide coating formed from the primary composition is modified by the boron and free silicon in the secondary composition to give a relatively craze and crack resistant surface which appears to have a closer coefficient of thermal expansion to the coefficient of thermal expansion for the substrate than do prior art coatings.

In applications where the coated substrate will be exposed to cyclic temperatures, in which temperatures lower than 2500° F. are encountered, an enhancement coating can be applied to the substrate after the application of the primary and secondary compositions. The combination of the coating formed from the primary and secondary compositions with the enhancement coating results in a protective coating that provides protection from degradation at cyclic temperatures that range between about −300° F. and 3000° F.

In one embodiment, the enhancement coating is formed by impregnating the external coating with tetraethyl orthosilicate (TEOS). The TEOS is then heat cured on the exterior coatings forming a silica coating. Such TEOS impregnation is effective, in and of itself, on the novel coatings of the invention. However, alternatively, thereafter, a slurry of an alkali silicate liquid and silicon carbide powder can be applied to the surface and heat cured. Alternatively, a mixture of water, sodium borate and sodium silicate can be substituted for the liquid alkali silicate.

In accordance with another embodiment of the enhancement coating, a monoaluminum phosphate solution containing alumina and silicon carbide is applied to the surface of the exterior secondary coating and is thereafter heat cured.

The enhancement coating has the effect of sealing the coating formed from the primary and secondary compositions, thereby preventing direct exposure of the substrate to the atmosphere when temperature cycling occurs, which can cause the underlying main coating to expand and contract. A substrate having the coating formed from the primary and secondary compositions and the enhancement coating can be subjected to temperature cycling in which temperatures as high as about 3000° F. and as low as −300° F. are attained in oxygen containing environments without significant detrimental effects to the substrate and without suffering the effects of thermal shock.

DETAILED DESCRIPTION

In accordance with one aspect of the present invention, primary and secondary compositions are provided for forming a protective coating on carbon-carbon substrate materials. While the present invention is primarily concerned with protecting reinforced carbon-carbon composite substrates, the invention is also applicable to the formation of protective coatings on various types of graphite and carbon substrates. The term "carbonaceous substrate" for purposes of this invention includes all such materials.

The primary and secondary compositions form a coating useful for protecting carbonaceous substrates from degradation at sustained temperatures of between about 2500° F. and 3000° F. without additional protective coatings and for providing resistance to the effects of thermal shock.

The primary composition for forming the protective coating on carbonaceous substrate materials comprises between about 40% and 50% particulate silicon by weight of the total composition, between about 30% and 50% particulate silicon carbide by weight of the total composition and between about 20% and 30% particulate alumina by weight of the total composition. The most preferred composition contains about 30% by weight silicon carbide, about 50% by weight silicon and about 20% by weight alumina.

Preferably, the particle size of the silicon and alumina components is about 325 Tyler standard screen scale. The silicon carbide is preferably between about 4.5˝ and 20.5 microns.

The most preferred type of silicon carbide is sold under the trade designation "RA 1200, Class 1-green grit" by the Carborundum Company, a Delaware corporation. The most preferred type of alumina is sold by the Aluminum Co. of America of Pittsburgh, Pa. under the trade designation "T-61."

In utilizing the composition in accordance with the present invention, the components are mixed together to form a uniform mixture. In order to form the first layer of the coating the mixture is brought into contact with the substrate that is to be coated. Generally, the entire substrate or part will be encased by the mixture to form a protective coating on the entire surface of the substrate. The substrate to be coated is placed in a graphite retort or other container that is capable of withstanding very high temperatures. The mixture is uniformly packed around the substrate so that the mixture completely encases the substrate. Preferably, the compaction of the mixture is tested for surface compaction. It is preferred that the surface compaction unconfined strength be between about 5.00 and 6.00 tons/ft$^2$ which can be measured on a soil tester sold by Soil Test Inc. of Chicago, Ill., Model No. CL 700, which has a probe of circular cross-section, one-half inch in diameter and is inserted to a depth of one-quarter inch into the mixture.

As an alternative to packing the dry uniform mixture to completely encase the carbon-carbon substrate as explained above, a slurry can be prepared with the uniform mixture by combining it with a carrier liquid. Suitable carrier liquids include water, isopropyl alcohol and mixtures thereof, for example. Sufficient liquid carrier is utilized to form a slurry which can be poured or pumped into the retort. Preferably from about 75 parts powder to about 25 parts by weight of the liquid carrier is employed.

When using a slurry, a first portion is poured into the retort prior to placement of part to form the initial ¾ inch thickness of pack material. The retort must be level prior to forming this layer. Bubbles are removed by vibrating or agitating the slurry after it is poured into the retort. Before placement of the part in the retort a ⅛ inch layer of wet pack mix is poured into retort to insure uniform contact with lower surface of parts. Balsa wood spacers can be used to maintain the alignment of the part as the retort is being filled. The balsa wood spacers can be raised or removed as required when the slurry is being added to the retort.

After filling the retort, the bulk of the solvent is allowed to flash off at ambient condition. The retort is then dried at 400° F. for 16 or more hours prior to placement in the coating furnace. Vacuum drying in the coating furnace may be used to supplement or replace the 400° F. oven drying cycle.

Thereafter, either in the case of a dry mix or slurry pack, the graphite retort is placed in an inert atmosphere. Preferably an argon gas atmosphere is utilized at a pressure of about 3 psi (gauge). The graphite retort and its contents are then heated to form the coating. The furnaces used for heating to produce the protective coating generally have graphite resistance tubes as heating elements or use graphite receptors which are heated by induction. The retort is then heated by radiation.

Generally, the retort and its contents are heated in the range of between about 2750° F. and 3000° F. for a period of time sufficient to form the protective coating of a desired thickness. It is generally preferred to first heat the retort and its contents to about 2700° F. so that a uniform elevated temperature can be more easily attained. After the initial heating, the retort and its contents are then maintained at a temperature of about 2750° for about 1 hour. The retort and its contents are then maintained at a temperature of about 2840°–2890° F. for about 1–2 hours. Finally, the retort and its contents are maintained at a temperature of about 2890°–2940° F. for about 1–2 hours. The retort and its contents are then cooled. Generally, cooling is accomplished by turning off the power to the furnace. The foregoing described step-heating process is preferred because a more uniform coating results than if the retort and its contents were heated to a fixed temperature. Generally, the 3–5 hour step-heating process as previously described produces a coating formed from the primary composition that is between about 5 and 50 mils thick.

It should be understood that the coating described herein is not an additional thickness of material, but rather is a change in the composition of the upper surface of the substrate. The process of the present invention results in a negligible increase in the thickness of the part.

The secondary composition for forming the coating in accordance with the invention contain between about 25% and 40% particulate silicon by weight of the total composition, between about 50% and 70% particulate silicon carbide by weight of the total composition and between about 1% and 15% particulate boron by weight of the total composition. In the preferred embodiment, the secondary composition comprises about 35% by weight silicon, about 60% by weight silicon carbide and about 5% by weight boron. Minor amounts of magnesium oxide should also be present. Generally, technical grade boron contains magnesium oxide as an impurity in a sufficient amount for purposes of the invention. Technical grade boron generally contains between about 8–10% by weight impurities, most of which is magnesium oxide. The magnesium oxide facilitates formation of the primary coating on the substrate. Generally, between about 2–8% magnesium oxide is preferred. About 4% magnesium oxide by weight of the boron is most preferred in the composition for forming the primary coating. Preferably, particulate amorphous boron is utilized and one preferred type can be obtained from the Kerr McGee Company, a corporation of the State of Delaware, sold under the trade designation "Trona" which contains about 90% to 92% by weight of particulate boron with the remainder containing impurities of which magnesium oxide is the major impurity. While understanding the function of the magnesium oxide is not essential to practicing the invention, it is believed that the magnesium oxide present in the boron acts as a fluxing agent facilitating formation of the coating.

Preferably, the particle size of the three components are as follows: silicon-about 325 Tyler standard screen scale; boron-between about 0.5 and 20 microns; and silicon carbide-between about 4.5 and 20.5 microns.

The most preferred type of silicon carbide is sold under the trade designation "RA 1200, Class 1"-green grit" by the Carborundum Company, a corporation of the State of Delaware.

In utilizing the secondary composition in accordance with the present invention, the components are mixed together to form a uniform mixture. In order to form the coating, the mixture is brought into contact with a release agent that encases the prior coated substrate. The release agent is a carbonaceous material that is preferably free of metallic impurities and encloses the substrate. The release agent may be, for example, ash free paper. Preferably, the release agent is a combination of ash free filter paper and filter paper pulp that is applied with a binder material, such as hydroxypropyl methyl cellulose. A preferred type of hydroxypropyl methyl cellulose is sold by the Dow Chemical Company of Midland, Mich. under the tradename "Methocel." The use of the filter paper in combination with filter paper pulp and binder solution allows the substrate to be easily encased by the release agent. The release agent facilitates removal of the substrate from the mixture after the coating has been formed. When a binder, such as hydroxypropyl methyl cellulose is utilized, the release agent is heated generally between about 200° F. and 400° F. to dry and cure the binder. After the release agent encloses the substrate, the mixture is brought into contact with the encased substrate. Generally, the entire substrate or part will be encased by the mixture resulting in a protective coating on the entire surface of the substrate.

Preferably, the encased substrate to be coated having the release agent thereon is placed in a graphite retort or other container that is capable of withstanding very high temperatures. The secondary composition mixture is uniformly packed around the substrate so that the mixture completely encases the substrate. Most preferably, the compaction of the mixture is tested for surface compaction. It is preferred that the surface compaction unconfined strength be between about 5 00 and 6 00 tons/ft$^2$ which can be measured on a soil tester sold by Soil Test Inc. of Chicago, Ill., Model No. CL 700, which is used with a probe of circular cross section, one-half inch in diameter and is inserted to a depth of one-quarter inch into the mixture.

As an alternative to packing the secondary composition mixture for completely encasing the substrate with the mixture, a slurry of the secondary composition and a carrier liquid can be utilized in which the slurry encases the substrate having the release agent thereon. Suitable carrier liquids include water, isopropyl alcohol and mixtures thereof, for example.

In packing the substrate in the composition, it is advantageous to provide parting planes for facilitating removal of the substrate after the coating is formed, since the compositions tend to solidify into a hard mass after heating. Parting planes can be provided by dividing the volume of composition into separate quadrants, utilizing a carbonaceous material such as paper, preferably ash free filter paper.

Generally, a weight is placed upon the unconfined surface of the mixture to help maintain contact between the mixture and the encased substrate, since the carbonaceous material used as a release agent which encases the substrate degrades upon heating.

After the composition encases the substrate and release agent, the composition is dried under vacuum. Thereafter, the graphite retort containing the mixture and substrate is placed in an inert atmosphere. Preferably, an argon gas atmosphere is utilized, at a pressure of about 3 psi (gauge). The graphite retort and its contents are then heated to form the coating. The furnaces used for heating to produce the protective coating generally have graphite resistance tubes as heating elements or use graphite receptors which are heated by induction. The retorts are then heated by radiation.

Generally, the retort and its contents are heated in the range of between about 2750° F. and about 3250° F. for a period of time sufficient to form the protective coating of a desired thickness. For liquid impregnated carbon-carbon substrates, it is generally preferred to first heat the retort and its contents to about 2750° F. to facilitate attainment of a desired temperature. Thereafter, the retort and its contents are maintained at a temperature of about 2750° F. for about one hour. The temperature is then raised to about 3050° F. and maintained for about two hours. Finally, the retort and its contents are heated so that a temperature of about 3250° F. is maintained for about two hours. The retort and its contents are then cooled. Generally, cooling is accomplished by turning off power to the furnace. The foregoing described step-heating process is preferred because a more uniform coating results than if the retort and its contents were maintained at a fixed temperature. Generally, the five hour step-heating process as previously described produces a coating that is between about 5 and 10 mils thick.

It should be understood that the coating described herein is not an additional thickness of material, but rather is a change in the composition of the upper surface of the substrate. The process of the present invention results in a negligible increase in the thickness of the part. The coating so formed from the primary and secondary compositions has excellent resistance to cracking and crazing and therefore provides better protection than coatings formed from either the primary or secondary compositions alone. Many times this coating alone or the coating sealed only by impregnation with TEOS will give excellent results.

Optionally, however, and especially in applications where the substrate will be exposed to cyclic temperatures, in which temperatures lower than 2500° F. are encountered, an enhancement coating can be applied to the substrate after the coating of the present invention has been applied. The combination of that coating of the present invention with the enhancement coating results in a protective coating on the substrate that is effective in protecting the substrate from degradation and oxidation at temperatures between about −300° F. and 3000° F.

In accordance with one embodiment of the enhancement coating, the underlying coating is impregnated with TEOS. The TEOS is then heat cured, thereby forming a silica coating. Thereafter, a mixture of an alkali silicate liquid and silicon carbide powder is applied to the surface and heat cured. Preferably, the TEOS is applied five times to the exterior secondary coating and heat cured after each application. Generally, the TEOS is cured at between about 225° F. and 275° F. for between about 45 and 60 minutes after it solidifies, forming crystals.

Preferably, after the fifth impregnation the part is heated between about 225° F. and 275° F. for about two hours after crystallization of the TEOS. Then, the part is cooled and reheated to between about 375° F. and 425° F. for between about 2 and 2.5 hours. Finally, the substrate is maintained at between about 565° F. and 625° F. for between about 4 and 7 hours.

Optionally, after the underlying coating has been impregnated with TEOS and cured, a slurry of an alkali silicate liquid and silicon carbide powder is applied to the surface and heat cured. Alternatively, a mixture of water, sodium borate and sodium silicate can be substituted for the liquid alkali silicate. Preferably, for 100 ml. of water, the mixture includes 10 gm. of sodium borate and 100 ml. of a sodium silicate solution containing 39% solids, sold by Ridland's Mfg. Co. of Dallas, Tex. The slurry is applied to the surface using a brush, spatula or other type of applicator. Preferably, the area of the part that is being coated with the slurry is kept in a wet condition as the slurry is being applied. The excess slurry is wiped off using, for example, a cheesecloth material.

After application of the slurry to the part, it is dried and cured. Preferably, the drying procedure is accomplished under ambient conditions for a period of about sixteen hours. Thereafter, the slurry is heat cured. Preferably, curing takes place by maintaining a temperature of between about 185° F. and 225° F. for at least about two hours, thereafter increasing the temperature to between about 375° F. and 425° F. for at least about two hours and finally increasing the temperature to between about 575° F. and 625° F. for between about 4 and 7 hours.

In accordance with a preferred embodiment of the enhancement coating, the slurry contains about 50 parts by weight of an alkali silicate liquid, most preferably the alkali silicate liquid sold under the tradename "Sermabond 487" by the Sermetel Corporation of Limerick, Pa. and about 50 parts by weight of a powder mixture containing equal amounts of black silicon carbide powder sold under the trade designation "RA 1200-Black Grit" by the Carborundum Company and graphite felt that has been converted to powdered silicon carbide felt. Preferably, the graphite belt utilized is "Grade WDF" from the Union Carbide Company, Carbide Products Division of New York, N.Y. The graphite felt can be converted to silicon carbide felt by packing the felt in a mixture containing between about 30% and 60% by weight silicon carbide, between about 30% and 50% by weight silicon and between about 10% and 20% by weight alumina. Preferably, the packed graphite felt is heated between about 2950° F. and 3050° F. for about 5–6 hours. After the graphite felt has been converted to silicon carbide felt, the felt is powdered by any suitable method, such as a ball mill. The powdered silicon carbide converted felt should have a small random fiber size. Preferably, the fibers will have a diameter of about 8 microns and will be of varied length, ranging between about several microns and about 0.01 inches.

In accordance with an alternate embodiment of the enhancement coating, a monoaluminum phosphate solution containing particulate alumina and silicon carbide is applied to the surface of the primary coating and is thereafter heat cured. Preferably, the liquid portion of the slurry contains about 55% by weight monoaluminum phosphate and about 45% by weight distilled water. The powder components of the slurry are preferably about 31.2% particulate silicon carbide by total weight of the powder components, preferably silicon carbide sold under the trade designation "RA 1200-black grit" by the Carborundum Company, about 31.3% of particulate silicon carbide converted felt by total weight of the powder components, about 32.8% particulate alumina by weight of the powder components, sold under the trade designation "T-61", and about 4.7% by weight particulate alumina sold under the trade designation "C-333", both from the Alcoa Corporation of Pittsburgh, Pa. The liquid and particulate components are combined in a ratio that is preferably about 1:1 by weight. The slurry can be applied using either a brush, spatula or other suitable instrument. The excess slurry is wiped off from the surface, preferably with a dry cheesecloth. The slurry applied to the surface is then heat cured. Preferably, after the slurry has been applied to the primary coating, it is dried at ambient temperatures for about 16 hours. Thereafter the slurry is cured by being maintained at about 200° F. for about two hours, then at about 400° F. for about two hours and finally at about 600° F. for about four hours. The curing is accomplished in an air oven and no special atmospheric requirements are necessary.

While the invention has been described with respect to preferred embodiments, it will be understood that the invention is capable of numerous rearrangements, modifications and alterations, and such rearrangements, modifications and alterations are intended to be within the scope of the appended claims.

For some types of substrates, it may be advantageous to pretreat the substrate prior to formation of the coating. In some cases, the coating is formed on the substrate more uniformly when the substrate is pretreated. Three types of pretreatments have been utilized. In accordance with one type of pretreatment, the substrate is impregnated with TEOS and cured. Preferably, the TEOS is applied five times, and in between each application curing is accomplished by heating between about 225° F. and 275° F. for about thirty minutes after crystallization of the TEOS occurs. After the fifth impregnation, the substrate has any excess material removed therefrom and is then heat treated by heating at about 400° F. for about two hours and about 600° F. for four hours.

The second type of pretreatment is heat treatment. Generally, the substrate is heated in an inert atmosphere, preferably argon, at a temperature of about 3250° F. for about one hour.

The third type of pretreatment is a combination of heat treatment followed by treatment with TEOS which can be accomplished as previously described.

Various advantages of the invention are apparent from the following examples:

EXAMPLE 1

A reinforced carbon-composite substrate is coated in accordance with present invention. The substrate is pretreated by impregnating it five times with tetraethyl orthosilicate (TEOS) and curing after each time as set forth in the description of the preferred TEOS pretreatment. The initial layer of coating is formed by utilizing a mixture of 30% silicon carbide, 50% silicon, and 20% alumina (by weight). The silicon carbide utilized can be obtained from the Carborundum Company under the trade designation "RA 1200-Green Grit", the alumina can be obtained from the Alumina Company of America under the trade designation "T-61" and the particulate silicon utilized has a particle size of about 325 Tyler Standard Screen scale. The substrate is packed in a graphite retort to the preferred surface compaction. Thereafter, the composition is dried under vacuum and placed in an inert atmosphere in the heating furnace. The retort and its contents are heated to about 2700° F. Thereafter, heated to 2750° F. for 1 hour. Then further heated at 2840°–2890° F. for 1–2 hours. And finally heated at 2890°–2940° F. for 1–2 hours. The substrate is then removed from the retort and cleaned.

The secondary composition comprising a mixture of 35% silicon, 60% silicon carbide, and 5% boron (by weight) is then employed to complete the coating. Amorphous boron from the Kerr McGee Company having the trade name "TRONA" is utilized. Silicon carbide having the trade designation "RA 1200-Green Grit" from the Carborundum Company is utilized and silicon having a particle size of about 325 Tyler Standard Screen scale is utilized.

The substrate is coated with a release agent comprising ash free filter paper and filter paper pulp mixed with "Methocel," a hydroxypropyl methyl cellulose from Dow Chemical Company. After the release agent is dried, the substrate is packed to the preferred amount of surface compaction.

After packing the composition is dried under vacuum and the graphite retort containing the mixture and substrate is placed in the heating furnace and an argon gas atmosphere. The retort is then heated to about 2750° F. and thereafter heated at about 3050° F. for 2 hours and finally at about 3250° F. for 2 hours.

After the part is cooled and cleaned an enhancement coating is applied to the substrate. In forming the enhancement coating, the substrate is impregnated 5 times with TEOS. The TEOS is heat cured after each application at between about 225° F. and 275° F. for between about 45 and 60 minutes after it solidifies. After the fifth impregnation, the substrate is heated for about 2 hours at between about 225° F. and 275° F. after crystallization of the fifth application of TEOS. The substrate is then cooled and reheated to about 400° F. for 2 hours and finally heated for 4 hours at about 600° F.

EXAMPLE 2

Samples were prepared which were coated with the primary composition only, the secondary composition only, and with the coating of the present invention employing both compositions as described above. The samples were exposed to open flame in torch testing and present weight loss was recorded at various times and temperatures for each sample. Table I sets forth the results of the tests.

TABLE I

| SAMPLE | TIME EXPOSED | TEMPERATURE, °F. | | | |
|---|---|---|---|---|---|
| | | 3100° F. | 3200° F. | 3300° F. | 3400° F. |
| primay | 15 min. | −0.28 | −3.67 | −6.30 | −9.39 |
| secondary | 15 min. | — | −3.46 | −7.19 | −11.15 |

TABLE I-continued

| SAMPLE | TIME EX-POSED | TEMPERATURE, °F. | | | |
|---|---|---|---|---|---|
| | | 3100° F. | 3200° F. | 3300° F. | 3400° F. |
| combined | 15 min. | 0.11 | −1.69 | −2.13 | −4.45 |
| primary | 30 min. | −0.82 | −2.32 | −6.09 | −15.20 |
| secondary | 30 min. | −3.90 | −5.19 | −7.68 | −76.40 |
| combined | 30 min. | 0.23 | −0.29 | −3.17 | — |
| primary | 60 min. | −1.73 | −3.73 | −8.49 | −19.88 |
| secondary | 60 min. | −2−17 | −7.68 | −8.32 | −98.1 |
| combined | 60 min. | 0.16 | — | −5.15 | — |

As can be seen from Table I, the unique coating of the present invention provides better protection than either of the coatings formed from the primary or secondary composition alone.

EXAMPLE 3

Samples coated in general accordance with the portions of Example 1, above, relating to formation of the coating from the primary and secondary compositions, but without further treatments to form any enhancement treatment, were furnace tested for oxidation resistance at 1,000°, 1600° and 2450° F. over times ranging from 3 to 30 hours. The percent weight change for such samples is located in Table II. Similarly, samples having the coating formed from the primary and secondary compositions, and in addition, treated with five TEOS impregnations were also tested. The weight loss of these samples appears in, parenthesis, in Table II.

TABLE II

| Elapsed Time | Percent of Weight Change | | |
|---|---|---|---|
| | 1000° F. | 1600° F. | 2450° F. |
| 3 hours | −0.48 (+0.57)* | −1.09 (+1.12) | +0.26 (+1.23) |
| 6 hours | −1.11 (+0.47) | −1.15 (+1.13) | +0.28 (+1.25) |
| 9 hours | −1.63 (−0.09) | −1.20 (+1.15) | +0.30 (+1.27) |
| 12 hours | −2.04 (−0.64) | −1.22 (+1.15) | +0.31 (+1.26) |
| 15 hours | −2.45 (−0.75) | −1.23 (+1.15) | +0.31 (+1.28) |
| 18 hours | −2.92 (−1.21) | −1.23 (+1.14) | +0.36 (+1.29) |
| 21 hours | −3.55 (−1.66) | −1.23 (+1.15) | +0.38 (+1.36) |
| 24 hours | −3.99 (−1.97) | −1.19 (+1.15) | +0.38 (+1.31) |
| 27 hours | −4.39 (−2.51) | −1.20 (+1.15) | +0.47 (+1.33) |
| 30 hours | −4.84 (−2.50) | −1.20 (+1.16) | +0.49 (+1.33) |

*Numbers in parenthesis designate test results on TEOS impregnated samples.

While the invention has been described with respect to preferred embodiments, it will be understood that the invention is capable of numerous rearrangements, modifications and alterations and such rearrangements, modifications and alterations are intended to be within the scope of the appended claims.

I claim:

1. A method for forming a protective coating on a carbonaceous substrate comprising:

first applying a primary mixture of particulate silicon, particulate silicon carbide, and particulate alumina to said substrate to form a Coating of said primary mixture on said substrate, and then heat treating the substrate thus coated with said primary mixture, and then applying a secondary mixture of particulate silicon, particulate silicon carbide and particulate boron to the thus heat treated coated substrate to form a coating of said secondary mixture thereon, and heat treating the substrate thus coated with said secondary mixture.

2. The method of claim 1 wherein the primary mixture comprises:

from about 40% to 50% particulate silicon by weight of the total composition of the primary mixture;

from about 30% to 50% particulate silicon carbide by weight of the total composition of the primary mixture; and from about 20% to 30% particulate alumina by weight of the total composition of the primary mixture.

3. The method of claim 1 wherein the secondary mixture comprises:

from about 25% to 40% particulate silicon by weight of the total composition of the secondary mixture;

from about 50% to 70% particulate silicon carbide by weight of the total composition of the secondary mixture; and from about 1% to 15% particulate boron by weight of the total composition of the secondary mixture.

4. The method of claim 1 wherein the primary mixture comprises:

about 50% particulate silicon by weight of the total composition of the primary mixture;

about 30% particulate silicon carbide by weight of the total composition of the primary mixture; and about 20% particulate alumina by weight of the total composition of the primary mixture.

5. The method of claim 1 wherein the secondary mixture comprises:

about 35% particulate silicon by weight of the total composition of the secondary mixture;

about 60% particulate silicon carbide by weight of the total composition of the secondary mixture; and about 5% particulate boron by weight of the total composition of the secondary mixture.

6. The method of claim 1 wherein the secondary mixture has a minor amount of magnesium oxide present in the boron component.

7. The method of claim 1 wherein each applying and heat treating step comprises:

packing the respective one of the primary mixture and the secondary mixture around the carbonaceous substrate in a retort;

drying the retort and its thus packed contents under a vacuum;

heating the thus dried retort and contents;

removing the thus heated carbonaceous substrate from the retort; and separating the thus removed carbonaceous substrate from any excess of the respective one of the primary mixture and the secondary mixture.

8. The method of claim 7 further comprising placing a layer of metal free carbonaceous filter paper between said carbonaceous substrate and the respective one of the primary mixture and the secondary mixture.

9. The method of claim 7 wherein the step of heating the retort for the heat treating of the substrate coated with said primary mixture comprises:

heating the retort and its contents in an inert atmosphere to a temperature of about 2750° F. for about one hour;

then heating the retort and its contents in the inert atmosphere to a temperature of from about 2840° F. to 2890° F. for about one to two hours; and then heating the retort and its contents in the inert atmosphere to a temperature of from about 2890° F. to 2940° F. for about one to two hours.

10. The method of claim 7 wherein the step of heating the retort for the heat treating of the substrate coated with said secondary mixture comprises:

heating the retort and its contents in an inert atmosphere to a temperature of about 2750° F. for about one hour;

then heating the retort and its contents in the inert atmosphere to a temperature of about 3050° F. for about two hours; and then heating the retort and its contents in the inert atmosphere to a temperature of about 3250° F. for about two hours.

11. The method of claim 1 wherein said primary mixture is applied in the form of a slurry.

12. The method of claim 1 wherein said secondary mixture is applied in the form of a slurry.

13. The method of claim 1 wherein said carbonaceous substrate is pretreated by applying and heat curing a solution of tetraethyl orthosilicate.

14. The method of claim 13 wherein said carbonaceous substrate is pretreated by applying and heat curing a solution of tetraethyl orthosilicate about five times.

15. The method of claim 1 wherein the thus heat treated carbonaceous substrate coated with said secondary mixture is treated with an enhancement coating, the enhancement coating treatment comprising:

applying to the thus heat treated carbonaceous substrate coated with said secondary mixture and heat curing at from about 225° F. to 275° F. for from about forty-five to sixty minutes a solution of tetraethyl orthosilicate about five times;

applying to the resulting treated substrate a mixture of alkali silicate liquid and silicon carbide powder;

heat curing the thus applied alkali silicate liquid and silicon carbide powder mixture;

then heating the resulting coated carbonaceous substrate to a temperature of from about 225° F. to 275° F. for about two hours;

then cooling and reheating the carbonaceous substrate to a temperature of from about 375° F. to 425° F. for from about two to two and one half hours; and then heating the carbonaceous substrate to a temperature of from about 575° F. to 625° F. for between about four to seven hours.

16. A carbonaceous substrate having a protective coating, said coating formed by the process of:

(a) applying to a surface of the substrate a primary mixture comprising from about 40% to 50% particulate silicon by weight of the total composition of the primary mixture, from about 30% to 50% particulate silicon carbide by weight of the total composition of the primary mixture, and from about 20% to 30% particulate alumina by weight of the total composition of the primary mixture; and heat treating the substrate having the thus applied primary mixture to form a coated surface; and (b) applying to the coated surface of the thus heat treated substrate a secondary mixture comprising from about 25% to 40% particulate silicon by weight of the total composition of the secondary mixture, from about 50% to 70% particulate silicon carbide by weight of the total composition of the secondary mixture, and from about 1% to 15% particulate boron by weight of the total composition of the secondary mixture; and heat treating the substrate having the thus applied secondary mixture.

17. The carbonaceous substrate of claim 16 having a protective coating, said primary mixture comprising:

about 50% particulate silicon by weight of the total composition of the primary mixture;

about 30% particulate silicon carbide by weight of the total composition of the primary mixture; and about 20% particulate alumina by weight of the total composition of the primary mixture.

18. The carbonaceous substrate of claim 16 having a protective coating, said secondary mixture comprising:

about 35% particulate silicon by weight of the total composition of the secondary mixture;

about 60% particulate silicon carbide by weight of the total composition of the secondary mixture; and about 5% particulate boron by weight of the total composition of the secondary mixture.

19. The carbonaceous substrate of claim 16 having a protective coating, wherein step (a) comprises:

packing the primary mixture around the carbonaceous substrate in a retort;

heating the retort and its contents in an inert atmosphere to a temperature of about 2750° F. for about one hour;

then heating the retort and its contents in the inert atmosphere to a temperature of from about 2840° F. to 2890° F. for from about one to two hours; and then heating the retort and its contents in the inert atmosphere to a temperature of from about 2890° F. to 2940° F. for from about one to two hours.

20. The carbonaceous substrate of claim 16 having a protective coating, wherein step (b) comprises:

packing the secondary mixture around the coated carbonaceous substrate, resulting from step (a), in a retort;

then heating the retort and its contents in an inert atmosphere to a temperature of about 2750° F. for about one hour;

then heating the retort and its contents in the inert atmosphere to a temperature of about 3050° F. for about two hours; and then heating the retort and its contents in the inert atmosphere to a temperature of about 3250° F. for about two hours.

* * * * *